Figure 1:
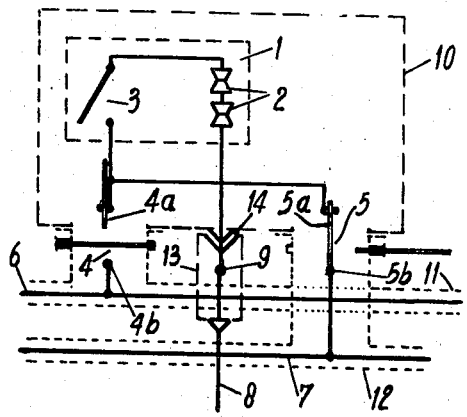

United States Patent

[11] 3,564,344

[72] Inventor Rintje Boersma
    Harmelen, Netherlands
[21] Appl. No. 734,782
[22] Filed June 5, 1968
[45] Patented Feb. 16, 1971
[73] Assignee N. V. COQ
    Utrecht, Netherlands
    a company of Netherlands
[32] Priority June 9, 1967
[33] Netherlands
[31] 6708018

[54] METAL CLAD SWITCH PLANTS FOR HIGH VOLTAGES
    4 Claims, 5 Drawing Figs.
[52] U.S. Cl. .................................................. 317/103,
    317/112, 200/148
[51] Int. Cl. .................................................. H02b 1/04,
    H01h 33/82
[50] Field of Search ........................................ 317/103,
    112; 200/148, 148.2

[56] References Cited
    UNITED STATES PATENTS
    3,235,774  2/1966  Frowein ........................ 317/103

FOREIGN PATENTS
245,093    6/1965  Austria ......................... 317/103
328,916    5/1930  Great Britain ................ 317/103
1,326,920  4/1963  France .......................... 317/103

Primary Examiner—Lewis H. Myers
Assistant Examiner—Gerald P. Tolin
Attorney—Imirie, Smiley, Snyder and Butrum ABSTRACT: A high voltage system includes at least two horizontal parallel bus bar systems enclosed in metal tubes and switching units connected thereto. The switching units each contain at least a circuit breaker and two bus bar isolating switches connected in series therewith and each isolating switch is connected to a bar of the bus bar system. The circuit breaker and the isolating switches are accommodated in a common metal casing which is joined to the metal tubes enclosing the bus bars through the medium of tubular extensions or collars which are joined to tubular parts extending perpendicularly upwardly from the metal tubes, the fixed contact of each isolating switch being permanently connected to the relevant bus bar and being contained in a respective one of the tubular parts.

INVENTOR
RINTJE BOERSMA
BY
ATTORNEYS

INVENTOR
RINTJE BOERSMA

METAL CLAD SWITCH PLANTS FOR HIGH VOLTAGES

The invention is directed to a switch assembly in which the switches and other devices of a switching unit which are intended for making connections within or to a bus bar system may be accommodated in uniform casings which allow various types of connections to be made within or to the bus bar system and which allow the casings of the switching units to be manufactured for the most part from steel, that is from magnetic material. In accordance with the invention this is realized in that in each one of said switching units the casing containing the circuit breaker and the isolator switches is positioned above the relevant bars of the bus bar systems and is composed of a vertical cylindrical first part having a horizontal cross section.

The invention makes a substantial uniformity and an easy interchangeability of the various switching units of the switch plant possible which results in that an existing switch plant can be easily enlarged or adapted to changed circumstances.

Figure 2:
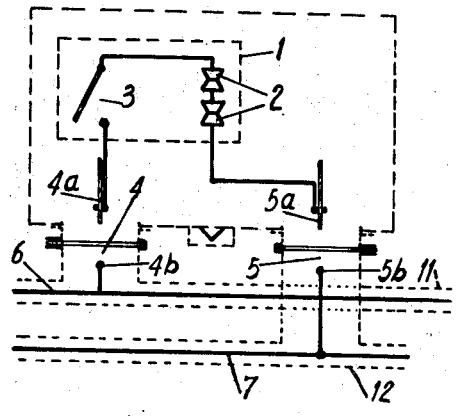
Figure 3:
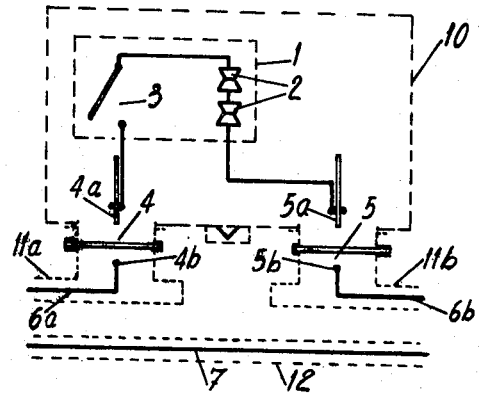
Figure 4:
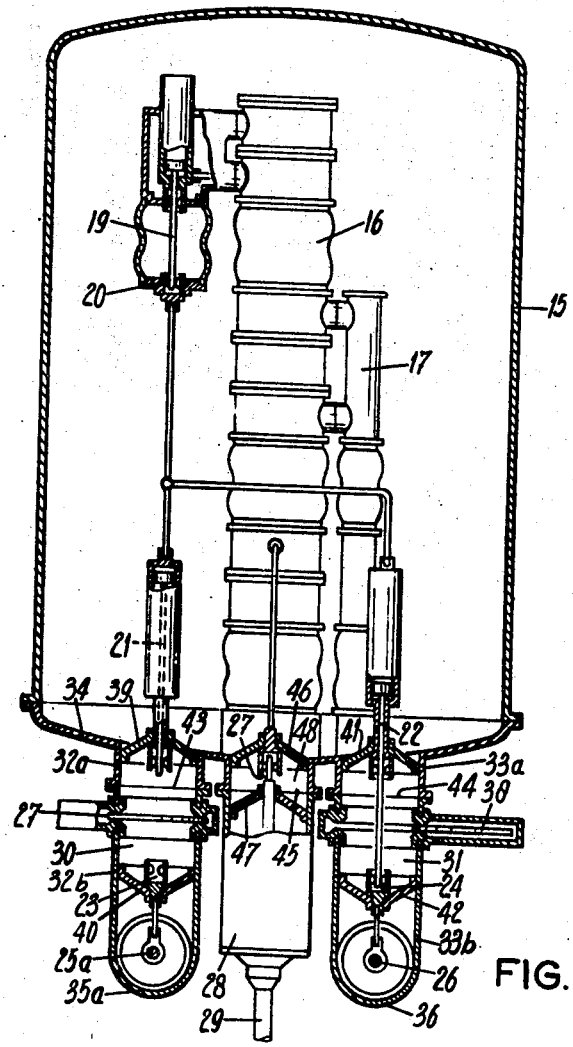
Figure 5:
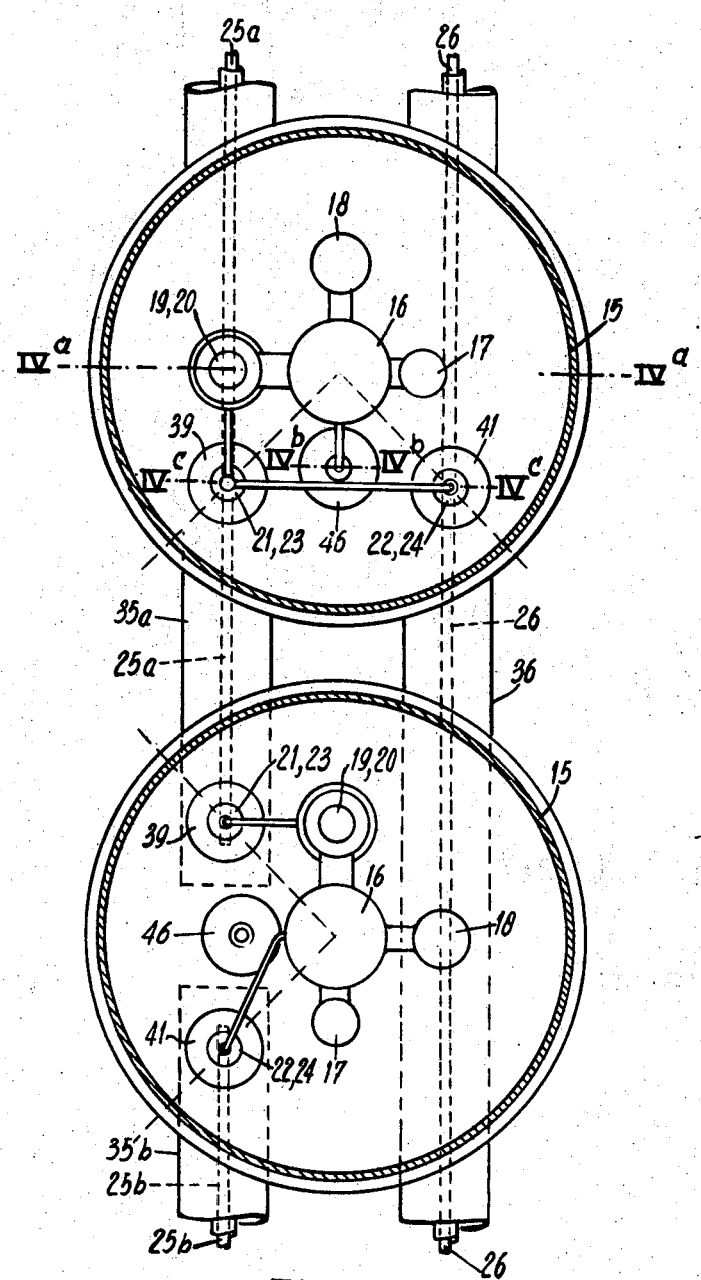

The invention will be elucidated with the aid of the drawing. Therein is:

FIG. 1 a diagram of a switching unit for the connection of a cable,

FIG. 2 a diagram of a transverse coupling switching unit,

FIG. 3 a diagram of a longitudinal coupling switching unit,

FIG. 4 partly vertical sections taken on the lines IIIa–IIIa, IIIb–IIIb and IIIc–IIIc in FIG. 5, partly an elevational view of a cable connecting unit of a metal clad switch plant constructed in accordance with the invention and FIG. 5 a cross-sectional view taken on the line V–V in FIG. 4 and also a corresponding cross-sectional view of a longitudinal coupling switching unit.

In the diagrams shown in FIGS. 1, 2 and 3 a composite circuit breaker is designated by 1. This circuit breaker comprises two pairs of cooperating switching contacts 2 for breaking the circuit only, said pairs of contacts being connected in series, and an isolating switch 3 connected in series with said switching contacts and used to keep the circuit interrupted after the switching arcs between the separating switching contacts 2 have been extinguished and to close the circuit. Two bus bar isolating switches are designated by 4 and 5 and they are connected to respective bus bars 6, 7 (FIGS. 1 and 2) or to the bus bars 6a, 6b (FIG. 3), respectively, of two different bus bar systems of the switch plant. FIG. 1 relates to a switching unit for the connection of a cable 8 with at least one of the two bus bars 6, 7. Therein the circuit breaker 1 is connected with its one end to both bus bar isolating switches 4, 5 and with its other end to terminal members 9 for said cable 8. FIG. 2 shows a transverse coupling switching unit for the interconnection of the two bus bars 6, 7 and FIG. 3 relates to a longitudinal coupling switching unit for the interconnection of the aligned individual parts 6a, 6b, into which the bus bar 6 has been divided. In both coupling switching units according to FIGS. 2 and 3, the circuit breaker 1 is connected between the two bus bar isolating switches 4, 5 and the terminal members 9 are omitted.

The part 10 of the metal envelope of the switching unit, the envelope of which is to be connected to earth, houses the circuit breaker 1 and the movable switching contacts 4a, 5a of the bus bar isolating switches 4, 5. Said part 10 of the envelope is detachably and removably connected with stationary parts 11, 12, 13 (FIG. 1), 11, 12 (FIG. 2) or 11a, 11b (FIG. 3) of the envelope. These stationary parts enclose the bus bars 6, 7 and the terminal members 9 (FIG. 1), the bus bars 6, 7 (FIG. 2) or the bus bars 6a, 6b (FIG. 3). For the detachable connection between the part 10 of the envelope and the box 13 which houses the terminal connector 9, a plug connection is used.

The cable connecting switching unit shown in FIG. 4 and in the upper part of FIG. 5 is provided with a vertical cylindrical metal casing 15 having a circular cross section. Accommodated in said casing is a composite circuit breaker consisting of a gas blast circuit breaker indicated in general by the reference character 16 provided with a conduit 17 for the supply of extinguishing gas under high pressure and a conduit 18 for the discharge of the used extinguishing gas under lower pressure. This casing also comprises an isolating switch having a moveable contact part and a fixed contact 20, the moveable contact being in the form of a pneumatically driven switching rod 19. The isolating switch is opened immediately after the switching arcs have been extinguished by the gas blast circuit breaker 16 and it keeps the circuit interrupted, whereas it is also used to close the circuit and thus corresponds to switch 3 in FIG. 1, for example, whereas the circuit breaker 16 corresponds to the switches 2 of the same figure. The casing 15 also contains the moveable switching rods 21, 22 of two bus bar isolating switches and their pneumatical driving mechanisms, these switches corresponding to switches 4 and 5 of FIG. 1, for example. The fixed contacts 23, 24 of said bus bar isolating switches are permanently connected with bus bars 25a, 26 of different bus bar systems. The movable contact 19 and fixed contact 20 of the isolating switch of the circuit breaker are permanently electrically connected with the switching rods 21, 22 of the two bus bar isolating switches. The gas blast circuit breaker 16 is coupled through a plug connection 27 with the terminal members (not shown) contained in a box 28 for the connection of a cable 29. The casing 15 may also contain transformers, condensers and other devices for measuring instruments and safety devices operating on the current or the tension as well as earthing switches and controlling members. These instruments, devices, switches and members have been omitted for the sake of clearness.

The switching spaces 30, 31 of the bus bar isolating switches are surrounded by the vertical metal tube members, each of which consists of two detachably interconnected coaxial parts 32a, 32b and 33a, 33b. The parts 32a, 33a thereof are attached to the bottom 34 of the casing 15 and each one of the other parts 32b, 33b is mounted on a horizontal bus bar tube 35a36 and surrounds the fixed contacts 23, 24 of an isolating switch. The switching spaces 30, 31 can be divided by movable partition walls 37, 38 into two parts which are separated in a gastight manner, when the bus bar isolating switches are opened. Said switching spaces are bounded at both ends by insulators 39, 40 and 41, 42.

The horizontal planes of separation 43, 44 between the coaxial parts 32a, 32b and 33a, 33b of the vertical tube members are located in the spaces between the partition walls and the switched-off switching rods 21, 22, whereas the cable terminal box 28 is detachably connected in the horizontal plane 45 to a connecting sleeve mounted on the lower side of the bottom 34 of the casing 15. The plane 45 intersects the space 48 which is confined at its ends by insulators 46, 47 and contains the plug connection 27.

The casing 15 and the parts 32a, 33a of the tube members, in which the circuit breaker 16, the components 17, 18, 19, 20, the switching rods 21 and 22 of the bus bar isolating switches and other devices and members are accommodated, are placed above the stationary parts of the switch plant formed by the bus bar tubes 35a, 35b, 36 containing the bus bars 25a, 25b, 26 of the parts 32b, 33b of the tube members comprising the fixed contacts 23, 24 of the isolating switches and the partition walls 37, 38 and the cable terminal box 28. Said casing 15 and said tube member parts 32a, 33a being adapted to be separated in the planes of separation 43, 44, 45 and removed from the said stationary parts.

In this switch plant the vertical tube members 32a, 32b and 33a, 33b, in which the bus bar isolating switches 21, 23 and 22, 24 are contained, are so arranged in respect of the casing 15 as to have their vertical axes lying at an angular distance of 90° from one another in a circular cylindrical plane concentric to the axis of the casing 15. This arrangement has the advantage that, when the casing 15 is turned together with its contents through an angle of 90° about its axis, its two tube members 32a, 32b and 33a, 33b will be in the same position in respect of the bus bar of one bus bar system as that, which in the described unit for the connection of a cable each tube member will have in regard to its own bus bar. If one of the two bus bars, say the bus bar 25, as is shown in FIG. 5, is divided into two separated parts 25a and 25b and if the cable connecting switching unit is changed into a coupling switching unit by a change of the connections between the switches and by the omission of the cable terminal members 27, 28, a casing comprising the switches and the connections suitable for a coupling switching unit can be used both for a transverse coupling, that means the coupling between the two bus bars 25, 26 or bus bar parts 25 a, 26 or 25b, 26 extending side by side and for a longitudinal coupling, that means the coupling between the parts 25a and 25b of the bus bar 25 shown in FIG. 5 (see the lower part). Instead of each cable connecting switching unit a transverse coupling unit can be inserted in the switch plant and vice versa. Consequently, the switched plant can be easily enlarged or adapted to changed circumstances.

A suitable arrangement of the several switches, devices and members of a cable connecting switching unit is obtained, when, as is shown in FIG. 4 and the upper part of FIG. 5, the plug connection 27 and the cable connecting box 28 comprising the terminal members are so mounted under the bottom 34 of the casing 15 as to have the vertical axis of said box 28 coinciding with the apex of a horizontal isosceles triangle, of which the base interconnects the axes of the isolating switches 21, 23 and 22, 24. In that case the connecting members for the cable or the network line come to lie between the bus bars of both bus bar systems.

A cable connecting switching unit could then even be mounted in the place of a longitudinal coupling switching unit (see the lower part of FIG. 5).

It is observed that the current path inside the casing 15 of each switching unit forms a loop, so that it is not necessary to take special measures in order to prevent the occurrence of unallowable losses in the cylindrical wall of the casing 15. However, as to the bottom 34 of the casing, the tube members 32a, 32b and 33a, 33b and the cable connecting box 28 one has to take care, say by the right selection of the material thereof, that these losses remain under a certain value.

I claim:

1. In combination with a system of parallel bus bars enclosed in metal tubes which are adapted to be connected to ground potential, and which are provided with a pair of parallel support collars perpendicular to said tubes, a fixed contact within each support collar connected to a respective one of said bus bars, a switch assembly including:

a common metal housing having a pair of parallel mounting collars projecting therefrom, said mounting collars being spaced apart commensurate with the spacing between said tubes, said housing being axially symmetrical and disposed with its axis parallel to the axes of said mounting collars, means joining said mounting collars in alignment with said support collars, a movable contact within each of said mounting collars, means within said housing for selectively moving said movable contacts into engagement with said fixed contacts, a cable connection box projecting from said housing adjacent said mounting collars, a cable within said cable connection box for connection to external equipment, a circuit breaker within said housing, and conductor means within said housing connecting said movable contacts, said circuit breaker and said cable in series whereby to form at least one looped current path within said housing.

2. In a system as defined in claim 1 wherein said housing includes a top wall, a bottom wall and a sidewall interconnecting said top and bottom walls, the axis of said housing being parallel to the axes of said mounting collars, and the axes of said mounting collars including an angle of 90° with respect to the axis of said housing.

3. In a system as defined in claim 2 wherein said cable connection box projects from said housing parallel to said mounting collars and is equidistantly spaced with respect thereto, insulator means closing said cable connection box said conductor means including a fixed contact projecting through said insulator means and a conductor within said housing connecting the last-mentioned fixed contact to said circuit breaker.

4. In a system as defined in claim 1 wherein said housing includes top and bottom walls connected by an elongate sidewall, a sleeve mounted on said bottom wall and extending axially and centrally within said housing, said mounting collars projecting outwardly from said bottom wall in parallel relation to said sleeve and including an angle of 90° with respect to the axis of said housing, said circuit breaker being housed within said sleeve, and means for blasting extinguishing gas through said sleeve.